UNITED STATES PATENT OFFICE.

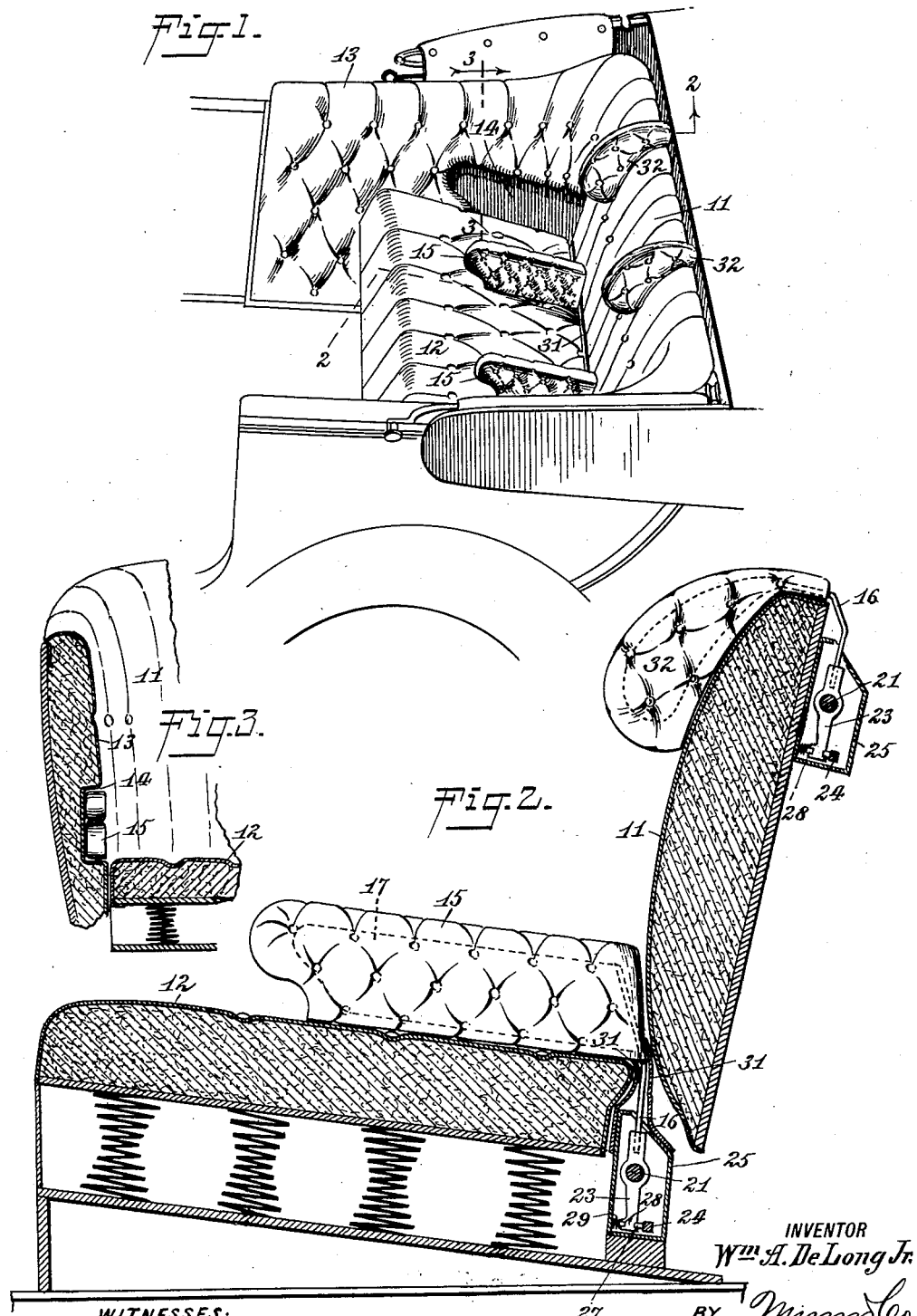

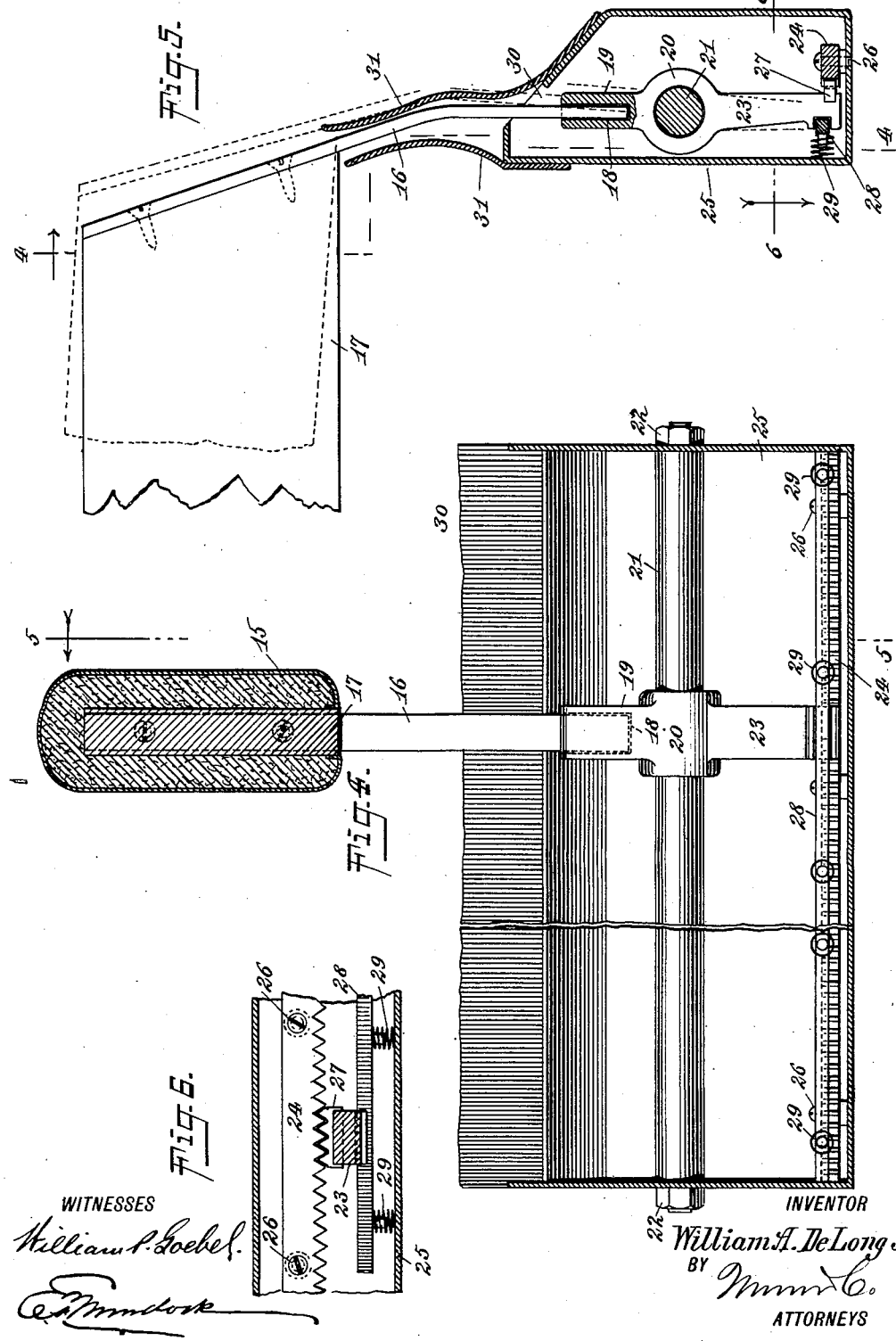

WILLIAM A. DE LONG, JR., OF PLAINFIELD, NEW JERSEY.

VEHICLE-SEAT ATTACHMENT.

1,303,043.   Specification of Letters Patent.   Patented May 6, 1919.

Application filed December 26, 1918. Serial No. 268,335.

*To all whom it may concern:*

Be it known that I, WILLIAM A. DE LONG, Jr., a citizen of the United States, and a resident of Plainfield, in the county of Union and State of New Jersey, have invented a new and Improved Vehicle-Seat Attachment, of which the following is a full, clear, and exact description.

Among the principal objects which the present invention has in view are: To adapt vehicle seats having capacity for several passengers for use temporarily by one or a limited number of passengers; to adapt a vehicle seat of enlarged carrying capacity for use in a limited capacity; to adapt the seat structure of an automobile or like vehicle to be quickly changed for use by one person; and to provide a structure with adjustable arm and shoulder rests for supporting passengers in desired riding position.

Drawings.

Figure 1 is a perspective view showing the tonneau seat of an automobile with arm and shoulder rests provided therefor in accordance with the construction and arrangement embodying the present invention;

Fig. 2 is a vertical longitudinal section on an enlarged scale, the section being taken as on the line 2—2 in Fig. 1;

Fig. 3 is a vertical cross section of a fragment of the seat construction, the section being taken as on the line 3—3 in Fig. 1, and showing an arm rest disposed in the upholstery at the side of the seat in accordance with the present invention;

Fig. 4 is a detail view on an enlarged scale showing in section, an arm rest and supporting structure therefor, the section being taken as on the line 4—4 in Fig. 5;

Fig. 5 is a longitudinal section of the supporting structure, and a fragment of the skeleton of the arm support, the section being taken on the line 5—5 in Fig. 4;

Fig. 6 is a detail view on an enlarged scale, showing fragments of the locking mechanism for retaining the service position of the arm rest.

Description.

Usually the seats of an automobile and particularly the rear seat of a tonneau, is capable of accommodating three or more persons. The seat is left undivided, the upholstery forming the back 11 and the seat cushions 12, being of usual construction. The upholstered sides 13 are preferably provided with pocket recesses 14, into which are moved the upholstered arm-rests 15. The arm-rests 15 are movable crosswise of the cushion 12 and are employed to divide or space off portions of the cushion 12. The large unspaced cushions with which automobiles are generally provided in the tonneau, are comfortable only when three people are seated therein. This is due largely to the fact that when the automobile makes a sharp turn, one occupant is apt to be thrown crosswise of the seat.

It has not been found desirable to partition the seats by dividing the same into equal divisions. To provide a temporary division or checking member, the arm-rests 15 are moved out of their respective recesses and disposed in service position substantially as shown in Fig. 1 of the drawings.

As seen in Figs. 2 and 4 of the drawings, the arm-rests 15 are supported by rods 16. The rods 16 are secured fixedly to the framing board 17, upon which the upholstery of the arm-rests 15 is mounted. The end of each rod 16 is arranged to enter a socket 18 in the extension 19 of the locking carrier 20. The carrier 20 is cylindrical in form and slides on the transverse rod 21, which is secured to the framework of the machine by means of the nuts 22 at the ends of the seat or cushion 12. The socket 18 forms a structure sufficiently rigid to support the rod 16 of the arm rest 15 in its extended service position. The carrier 20 has a lower extension 23, which is employed for locking the carrier in its adjusted positions.

To lock the carrier 20 and extension 23 thereof, a rack bar 24 is fixedly mounted in the base of a containing receptacle 25, by screws 26. As shown best in Fig. 6 of the drawings, the teeth of the bar 24 are pointed to avoid clashing with the teeth of an engaging segment 27.

As shown by dotted lines in Fig. 5, the carrier 20 is rocked on the rod 21 to a position where the teeth of the segment 27 disengage the teeth of the bar 24. In practice, this action is promoted by lifting the arm-rest to the position shown by dotted lines in said Fig. 5.

When rocking the carrier 20 as indicated, the presser bar 28 is retracted against the springs 29. The extension 23 has a rest at the lower end thereof to hold the presser bar 28 and to support the same in service.

The receptacle 25 is a case which may be attached to the automobile structure in any suitable manner. The receptacle is preferably constructed from sheet metal. Other material, however, may be used. The receptacle has an opening 30, through which extend the rods 16. Mounted on the receptacle, at opposite sides of the opening 30, are flexible strips 31. The strips 31, as best shown in Fig. 2, rest between the cushion 12 and the upholstery of the back 11, the purpose of the strips being to save the upholstery of the said cushion and back from wear by the rods 16. The edges of the strips are interposed between said upholstery and the rods 16.

There are usually provided two arm-rests 15. When three passengers are occupying the seat, the said arm-rests are moved one to each of the pocket recesses 14, to be disposed therein. When, however, one or two persons are riding on the rear seat it is found desirable to move the arm-rests 15 out of the pocket recesses, and to dispose the same to provide comfortable but snug seating space for the passenger or passengers. When, now, the car is operated over a rough road, the passenger or passengers are held by the arm-rests snugly in their positions without necessitating muscular effort as is usually required.

When it is desired to move the arm-rests in the manner set forth, the passenger grasps the same at the forward end thereof to lift the same. The cushion of the back 11 yields sufficiently to the pressure of the rear end of the rest 15, to permit the carrier 20 to be rocked on the rod 21, with the result that the teeth of the segment 27 are disengaged from the teeth of the rack bar 24. The springs 29 permit the presser bar to recede in accord with the movement described. When the teeth of the segment and rack are so disengaged, it is evident that the arm-rest 15 may be moved across the seat cushion 12 to any desired location thereon. When moved to the position desired, the forward end of the arm-rest is lowered and the presser bar 28 is permitted to rock the carrier 20 to the position where the teeth of the segment 27 engage those of the rack bar 24, locking the carrier in its new position.

It is obvious that the arm-rests may be adjusted to any position and also that the upholstery of the cushion 12 and the back 11 is protected from wear by the strips 31, between which the rods 16 move. If at any time it is desired the arm-rests 15 may be removed from the service, the rods 16 being lifted from the sockets of the extensions 19 of the carrier.

As shown best in Fig. 2 of the drawings, the apparatus above described is employed to hold shoulder-rests 32. When employed in this service, the receptacle 25 is secured to the vehicle structure in any suitable manner, and the rods 16 are bent to extend over the top of the cushion of the back 11. To shift the shoulder-rests 32, the same operation is performed, as above described with reference to the arm-rests 15. The shoulder-rests 32 are stowed away when not in service.

From the foregoing, it will be seen that the tonneau seat of an automobile or similar vehicle which is of usual construction, may be quickly and easily made comfortable for one or more passengers, by adjusting or removing the arm-rests 15 and shoulder-rests 32 into or out of service position.

Claims.

1. A seat attachment for vehicles comprising movable supports for dividing the seating space of a cushion; and means for locking said supports in adjusted positions; said locking means engaging said supports at the rear ends to be concealed at the rear of the seat.

2. A seat attachment for vehicles comprising movable members extending above a seat for dividing the seating space thereof; and means disposed at the rear ends of said members for holding the same in adjusted position; said last-mentioned means being engageable and releasable by a relative rocking movement of said seat dividing members.

3. An attachment as characterized comprising a vehicle seat; side pockets therein; movable members for dividing the seating space of the seat; said members being movable into or out of said pockets; independent supports for said members; and disposed at the rear ends thereof, and means for locking said supports and members in fixed relation.

4. In combination with a vehicle seat having separated seat and back cushions, of a movable member for dividing the seating space adapted to extend across the cushion in superposed relation thereto; a support for said member and positioned to be concealed at the back of the seat; a guide for said support on which the latter is slidable and rockable; and means engageable or disengageable by rocking said support for locking said support on said guide.

5. In combination with a vehicle seat having separated seat and back cushions, of a movable member for dividing the seating space adapted to extend across the cushion in superposed relation thereto; a support for said member; a guide for said support; and means for locking said support on said guide, said means embodying a holding mechanism adapted for preventing the movement of said support on said guide when said member is disposed as in service, but disengageable to permit sliding of the support by a relative rocking of the support on said guide.

6. In combination with a vehicle seat having separated seat and back cushions, of a movable member for dividing the seating space adapted to extend across the cushion in superposed relation thereto; a support for said member; a guide for said support; and means for locking said support on said guide, said means embodying a rack bar disposed below said guide and a toothed extension of said support disposed in operative relation to said bar for engaging the same when rocked into position.

7. The combination with a vehicle seat having separated seat and back cushions, of an arm-rest having a supporting rod extensible between said cushions; a support for said arm-rest adapted to receive in holding relation said rod; a guide shaft extending in parallel relation to said seat and said cushions; a rack bar disposed below said guide bar; and a toothed member mounted on said support for engaging the teeth of said rack bar when said support is rocked on said shaft.

8. The combination with a vehicle seat having separated seat and back cushions, of an arm-rest having a supporting rod extensible between said cushions; a socket for said supporting rod; a guide shaft extending in parallel relation to said seat and said cushions; an element carrying said socket and slidable and rockable on said guide shaft; a rack bar disposed below said guide shaft; a toothed member mounted on said element for engaging the teeth of said rack bar when said element is rocked on said shaft; and yielding means for normally holding said toothed member and rack bar in locked relation.

9. The combination with a vehicle seat having separated seat and back cushions, of an arm-rest having a supporting rod extensible between said cushions; a support for said arm-rest adapted to receive in holding relation said rod; a guide shaft extending in parallel relation to said seat and said cushions; a rack bar disposed below said guide bar; a toothed member mounted on said support for engaging the teeth of said rack bar when said support is rocked on said shaft; and a plurality of flexible strips extending between the juxtaposed parts of said cushions for receiving said rod.

10. The combination of a vehicle seat having upholstered seat, back and end cushions, the end cushions being provided with pocket recesses; a plurality of upholstered arm-rests, each rest having a supporting bar connected therewith adapted to extend and move between the juxtaposed portions of said back and seat cushions; means adjacent the juxtaposed portions of said seat and back cushions for supporting in operative relation, said arm-rests; and a lock for holding said supporting means in adjusted positions.

WILLIAM A. DE LONG, Jr.